US012625812B2

(12) United States Patent
Lim et al.

(10) Patent No.: US 12,625,812 B2
(45) Date of Patent: May 12, 2026

(54) COHERENT SYSTEM AND A METHOD OF MAINTAINING CACHE COHERENCE USING THEREOF

(71) Applicant: SKYECHIP BERHAD, Bayan Lepas (MY)

(72) Inventors: Soon Chieh Lim, Pulau Pinang (MY); Yu Ying Ong, Pulau Pinang (MY)

(73) Assignee: SKYECHIP BERHAD, Bayan Lepas (MY)

( * ) Notice: Subject to any disclaimer, the term of this patent is extended or adjusted under 35 U.S.C. 154(b) by 0 days.

(21) Appl. No.: 18/885,842

(22) Filed: Sep. 16, 2024

(65) Prior Publication Data

US 2025/0258771 A1     Aug. 14, 2025

(30) Foreign Application Priority Data

Feb. 8, 2024     (MY) ............................ PI2024000899

(51) Int. Cl.
*G06F 12/0817* (2016.01)
(52) U.S. Cl.
CPC .... *G06F 12/0828* (2013.01); *G06F 2212/621* (2013.01)

(58) Field of Classification Search
None
See application file for complete search history.

(56) References Cited

U.S. PATENT DOCUMENTS

2006/0080508 A1 *  4/2006  Hoover ............... G06F 12/0835
                                                          711/146
2016/0062890 A1    3/2016  Salisbury et al.
2025/0110880 A1 *  4/2025  Palfer-Sollier ...... G06F 12/0833

* cited by examiner

*Primary Examiner* — Baboucarr Faal
(74) *Attorney, Agent, or Firm* — Jayne Saydah

(57) ABSTRACT

A coherent system including a plurality of processing units; an interconnect comprising a snoop filter, a conflict buffer to track in-progress or outstanding snoop, and a snoop state machine for managing snoop requests and snoop responses between the snoop filter, the conflict buffer and the processing units; wherein the snoop filter is configured to copy cacheline data of a cacheline that the processing unit reads on, match the cacheline address with tags of the snoop filter, and receive the snoop responses; wherein the conflict buffer is configured to indicate a hit or miss status based on the matching of the snoop filter and to send peer-cache snoop requests to different processing units. Further, a method of maintaining cache coherence using the coherent system also disclosed.

7 Claims, 9 Drawing Sheets

Sending a query by a snoop state machine to a snoop filter when a processing unit reads a cacheline (101)

↓

Matching a query address of the snoop filter with the address of the cacheline (102)

↓

Comparing address of the cacheline with all tags of the snoop filter (103)

↓

Indicating a miss result in the snoop filter if the tags are not matched (104)

↓

Choosing a set of the snoop filter to pass the miss result to the snoop state machine (105)

↓

Searching a snoop ID in a conflict buffer that has a fewer number of entries than the snoop filter, if no entry matched, selecting a free entry in the conflict buffer, marking the snoop ID of the selected free entry of the conflict buffer with the value of the query address and set an in-progress bits of that entry of the conflict buffer to 1 that indicates that the snoop on the query address is now in progress (106)

↓

Sending a query to a subsequent cacheline by a subsequent processing unit (107)

↓

Repeating the steps from comparing address of the subsequent cacheline with all tags of the snoop filter to find a match (108)

100

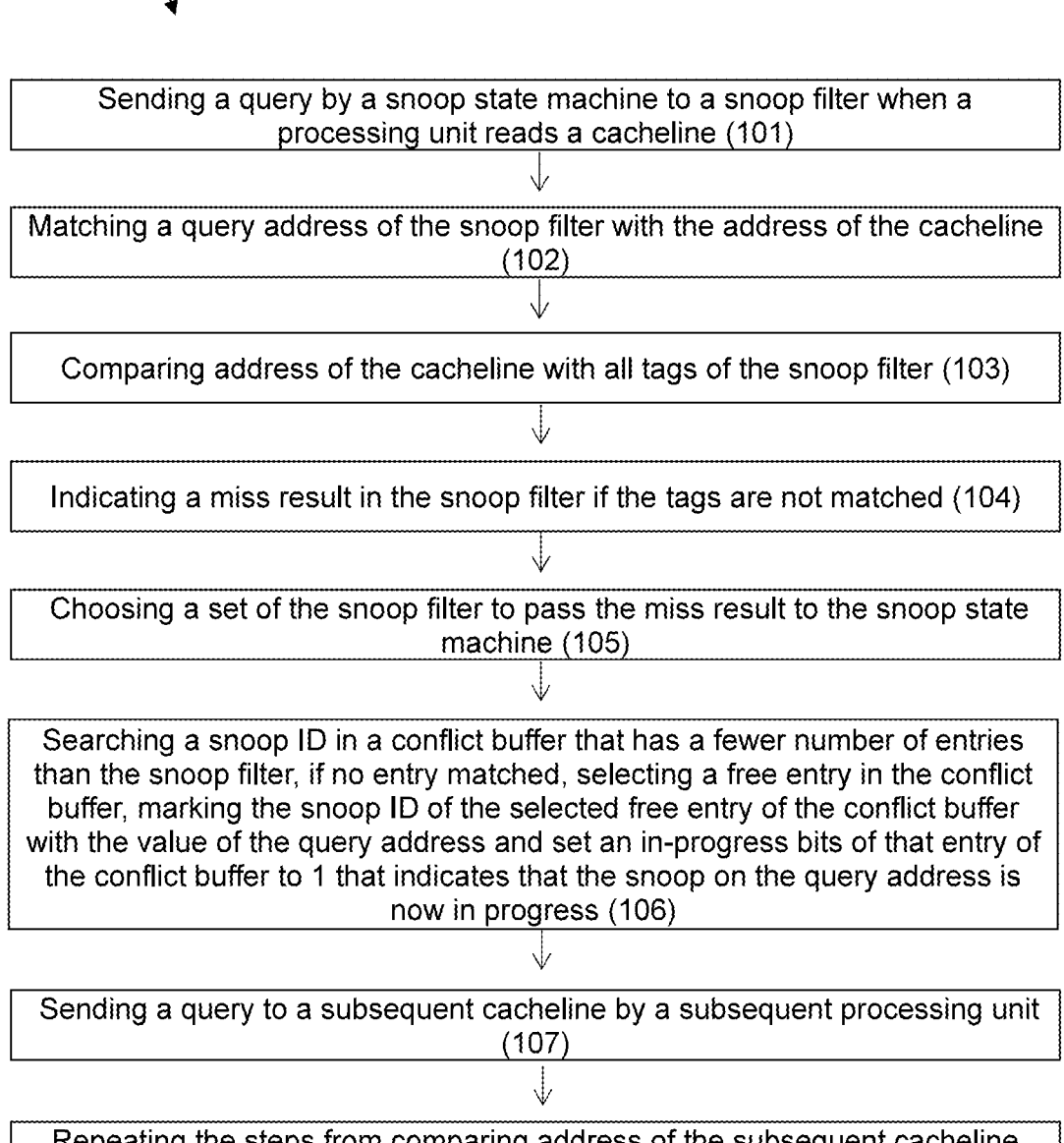

Sending a query by a snoop state machine to a snoop filter when a processing unit reads a cacheline (101)

↓

Matching a query address of the snoop filter with the address of the cacheline (102)

↓

Comparing address of the cacheline with all tags of the snoop filter (103)

↓

Indicating a miss result in the snoop filter if the tags are not matched (104)

↓

Choosing a set of the snoop filter to pass the miss result to the snoop state machine (105)

↓

Searching a snoop ID in a conflict buffer that has a fewer number of entries than the snoop filter, if no entry matched, selecting a free entry in the conflict buffer, marking the snoop ID of the selected free entry of the conflict buffer with the value of the query address and set an in-progress bits of that entry of the conflict buffer to 1 that indicates that the snoop on the query address is now in progress (106)

↓

Sending a query to a subsequent cacheline by a subsequent processing unit (107)

↓

Repeating the steps from comparing address of the subsequent cacheline with all tags of the snoop filter to find a match (108)

Figure 1

20 conflict buffer

COHERENT SYSTEM AND A METHOD OF MAINTAINING CACHE COHERENCE USING THEREOF

CROSS-REFERENCE TO RELATED APPLICATIONS

This application claims priority to and the benefit of Malaysian Patent Application No. PI2024000899 filed in the Malaysian Intellectual Property Office on Feb. 8, 2024, the entire contents of which are incorporated herein by reference its entirety.

TECHNICAL FIELD

The present invention relates generally to a cache-coherent Network-On-Chip (NoC) architecture. More particularly, the present invention relates to a coherent system implemented with snoop filter and a method of maintaining cache coherence using the coherent system.

BACKGROUND ART

A snoop filter is basically a directory that keeps track of which central processing unit in a coherent system has a copy of the cacheline. The snoop filter is an array of multiple entries. It is essentially organized just like a cache. The array can be arranged in a direct-mapped style or a set-associate style, similar to a data cache. In a normal cache, the entire cacheline is stored as data. Traditionally, static random access memory is used for 1:1 mapping of valid and in-progress status bits to each snoop filter entry, which requires a large area for implementation and restricts to the network bandwidth capacity.

There have been several solutions provided to improve coherent system and a method of maintaining cache coherence using a coherent system, and one of them has been discussed below:

US20160062890 A1 related to an interconnect has coherency control circuitry for performing coherency control operations and a snoop filter for identifying which devices coupled to the interconnect have cached data from a given address. When an address is looked up in the snoop filter and misses, and there is no spare snoop filter entry available, then the snoop filter selects a victim entry corresponding to a victim address and issues an invalidate transaction for invalidating locally cached copies of the data identified by the victim. The coherency control circuitry for performing coherency checking operations for data access transactions is reused for performing coherency control operations for the invalidate transaction issued by the snoop filter.

The aforementioned reference provides an interconnect has coherency control circuitry for performing coherency control operations and a snoop filter for identifying which devices coupled to the interconnect have cached data from a given address. Nevertheless, it still has a number of limitation and shortcoming such as non-scalable, consuming large area for implementation and inflexible Accordingly, there remains a need to provide a scalable coherent system and method to maintaining cache coherence using the coherent system for area saving and better performance.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to provide a dual mode snoop filter with conflict buffer for an area-efficient and flexible implementation that can be easily scaled according to system requirements.

Accordingly, these objectives may be achieved by following the teachings of the present invention. The present invention relates to a coherent system, characterized by: a plurality of processing units; an interconnect comprising a snoop filter, a conflict buffer to track in-progress or outstanding snoop, and a snoop state machine for managing snoop requests and snoop responses between the snoop filter, the conflict buffer and the processing units; wherein the snoop filter is configured to copy cacheline data of the cacheline that the processing unit reads on, match the cacheline address with tags of the snoop filter, and receive the snoop responses; wherein the conflict buffer is configured to indicate a hit or miss status based on the matching of the snoop filter and to send peer-cache snoop requests to different processing units.

The present invention also relates to a method of maintaining cache coherence using a coherent system, the method comprising the steps of: sending a query by a snoop state machine to a snoop filter when a processing unit reads a cacheline; matching the query address of the snoop filter with the address of the cacheline; comparing address of the cacheline with all tags of the snoop filter; indicating a miss result in the snoop filter if the tags are not matched; choosing a set of the snoop filter to pass the miss result to the snoop state machine; searching a snoop ID in a conflict buffer that has a fewer number of entries than the snoop filter, if no entry matched, selecting a free entry in the conflict buffer, marking the snoop ID of the selected free entry of the conflict buffer with the value of the query address and set an in-progress bits of that entry of the conflict buffer to 1 that indicates that the set of snoop on the query address is now in progress; sending a query to a subsequent cacheline by a subsequent processing unit; and repeating the steps from comparing address of the subsequent cacheline with all tags of the snoop filter to find a match.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figures, with like reference numbers referring to like structures across the views, wherein:

FIG. 1 is a flow diagram illustrating a method of maintaining cache coherence using a coherent system in accordance with an embodiment of the present invention;

DETAILED DESCRIPTION OF THE INVENTION

Figure 2:
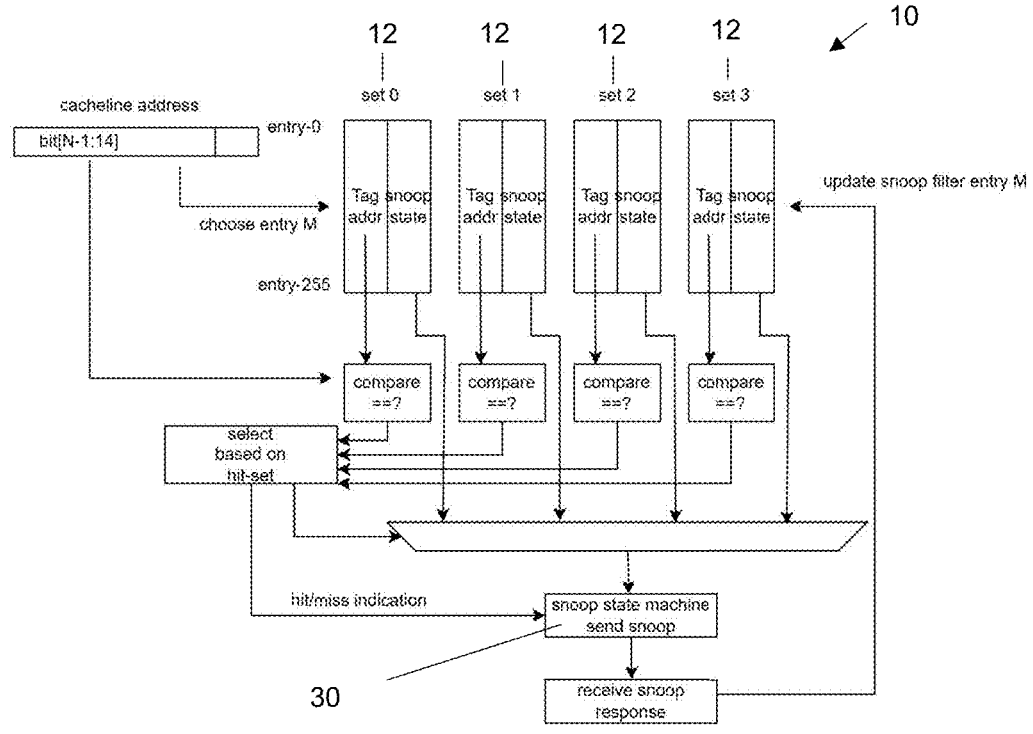
FIG. 2 is an example illustrating a 4-way set associative snoop filter with 256 entries, whereby 8-bits address bits are extracted from the querying address to map to the 256-entries.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an"

mean "at least one" and the word "plurality" means one or more, unless otherwise mentioned. Where the abbreviations or technical terms are used, these indicate the commonly accepted meanings as known in the technical field.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

Referring to the drawings, the invention will now be described in more details.

The present invention relates to a coherent system, characterized by: a plurality of processing units; an interconnect comprising a snoop filter (10), a conflict buffer (20) to track in-progress or outstanding snoop, and a snoop state machine (30) for managing snoop requests and snoop responses between the snoop filter (10), the conflict buffer (20) and the processing units; wherein the snoop filter (10) is configured to copy cacheline data of the cacheline that the processing unit reads on, match the cacheline address with tags of the snoop filter (10), and receive the snoop responses; wherein the conflict buffer (20) is configured to indicate a hit or miss status based on the matching of the snoop filter (10) and to send peer-cache snoop requests to different processing units.

In accordance with an embodiment of the present invention, the coherent system can be extended to include data on top of cache ownership information to enable system level cache support.

In accordance with an embodiment of the present invention, the snoop filter (10) comprises a number of sets (12), a number of entries, a number of address bits, and each of the set comprises a tag and a snoop state.

In accordance with an embodiment of the present invention, the snoop filter (10) is a direct-mapped style array or a set-associate style array.

In accordance with an embodiment of the present invention, the conflict buffer (20) comprises a configurable number of entries, each entry comprises a snoop ID and a number of in-progress bits that indicates snoop status. Further, the snoop ID is the address field that is compared with the query address. If there is a match, then this is a conflict buffer (20) hit. Its data field is then sent to the snoop filter (10).

Figure 3:
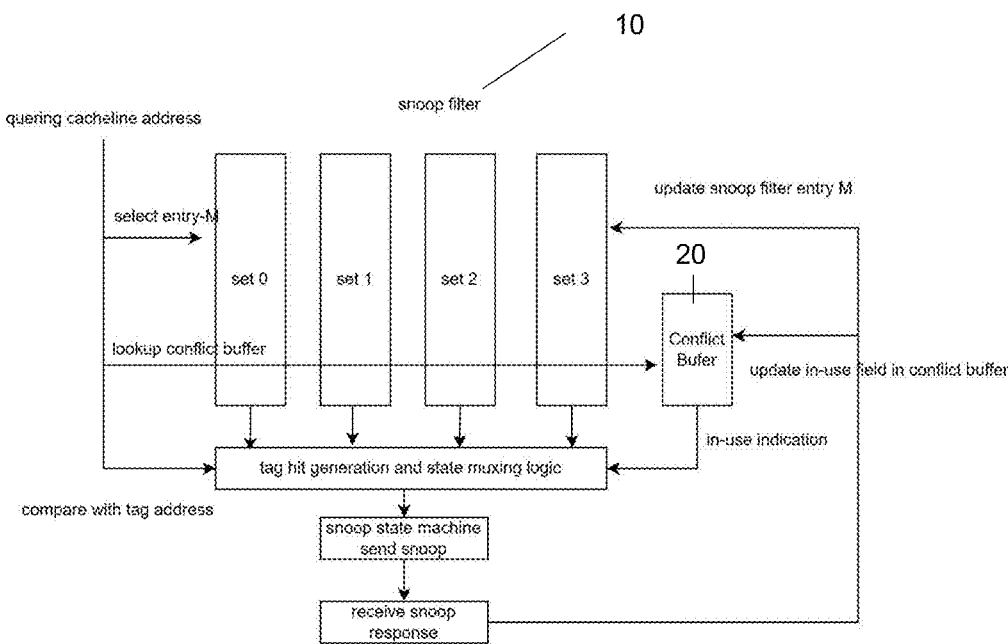
FIG. 3 illustrating a coherent system architecture that comprises a snoop filter, a conflict buffer and a snoop state machine in accordance with an embodiment of the present invention.

In accordance with an embodiment of the present invention, the conflict buffer (20) is used alongside with the snoop-filter, whereby when a cacheline address is presented to the snoop filter (10), part of the address is used to select an entry from the snoop filter (10). The same part of the address is used to lookup the conflict buffer (20) as shown in FIG. 3.

In accordance with an embodiment of the present invention, the number of in-progress bits of the conflict buffer (20) corresponds to a number of sets (12) of the snoop filter (10).

In accordance with an embodiment of the present invention, a number of entries of the snoop filter (10) is higher than a number of entries of the conflict buffer.

Figure 4:
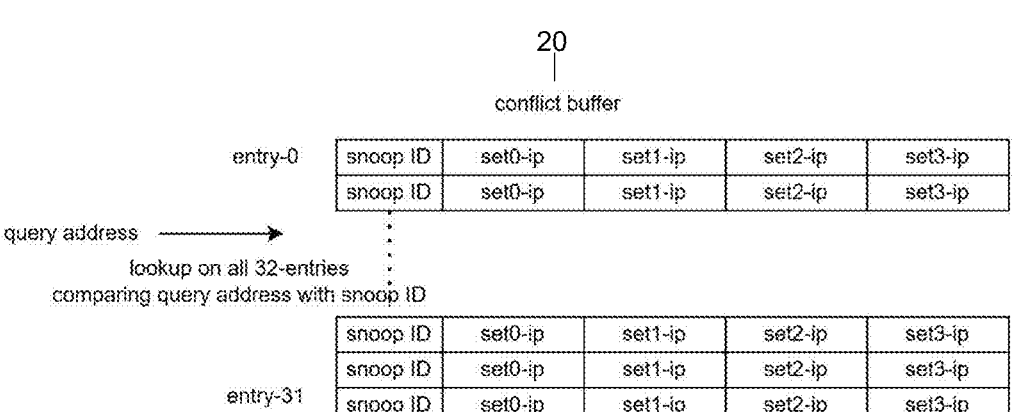
FIG. 4 illustrating a conflict buffer to track an outstanding snoop in accordance with an embodiment of the present invention.
Figure 5:
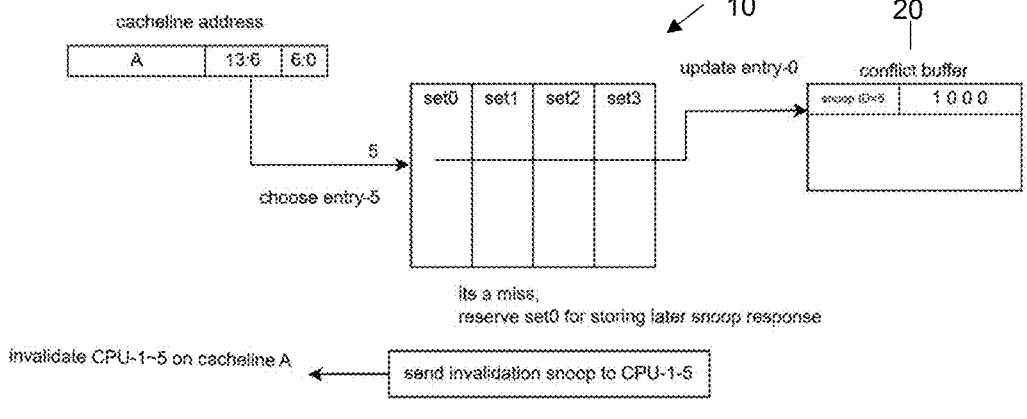
FIG. 5 is an example illustrating the conflict buffer entry-0 is marked with 'snoop ID' set to 5 (A[13:6]==5), and out of the 4-bits 'ip' bits, bits[0] set to 1.
Figure 6:
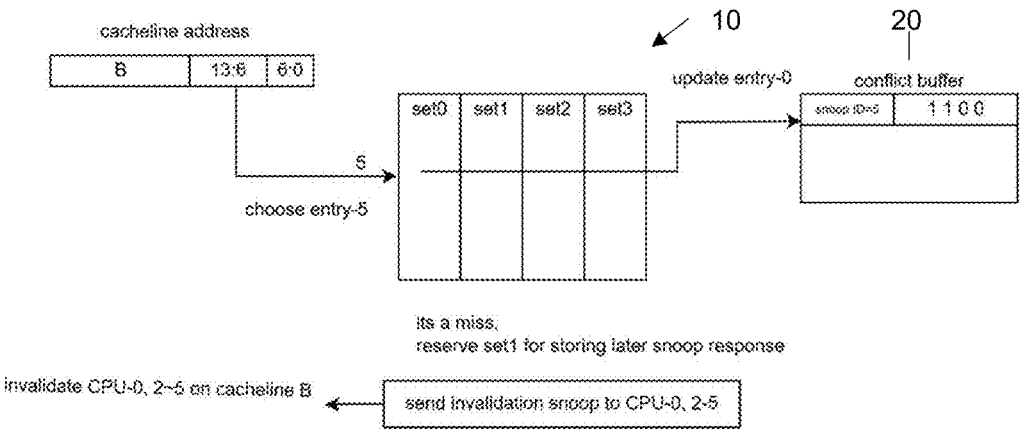
FIG. 6 is an example illustrating the second request to address B, but with address bits A[13:6]==5.
Figure 7:
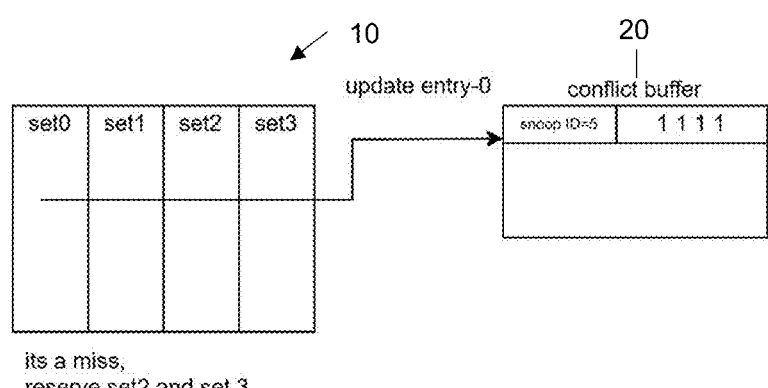
FIG. 7 is an example illustrating all 4 sets of entry-5 of the snoop filter are currently snoop-in-progress.
Figure 8:
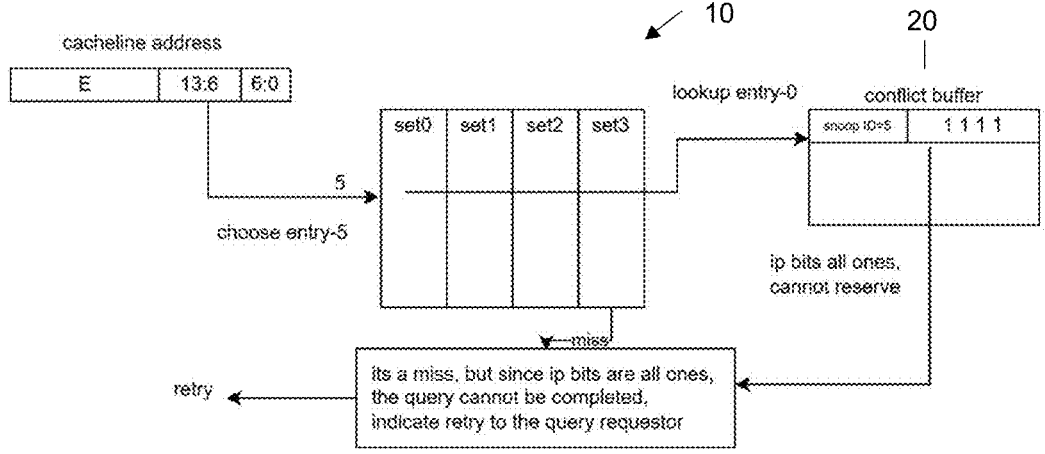
FIG. 8 is an example illustrating a miss in the snoop filter that resulted in a 'conflict' to the snoop state machine wherein the query has to be retried.
Figure 9:
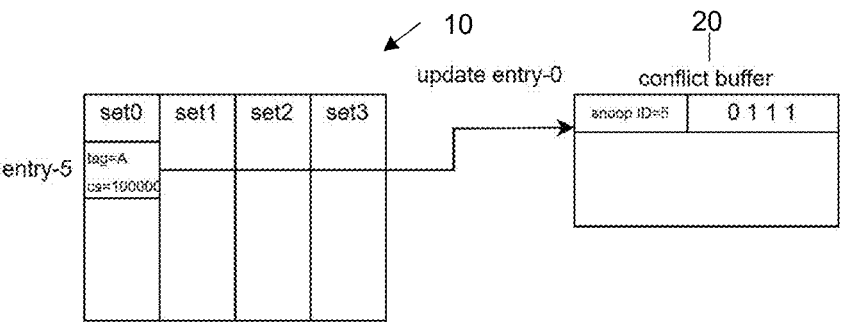
FIG. 9 is an example illustrating how the snoop filter received an update to set-0 of the snoop filter, which resulted in the 'ip' bit[0] being cleared, wherein set-0 is no longer snoop-in-progress.
Figure 10:
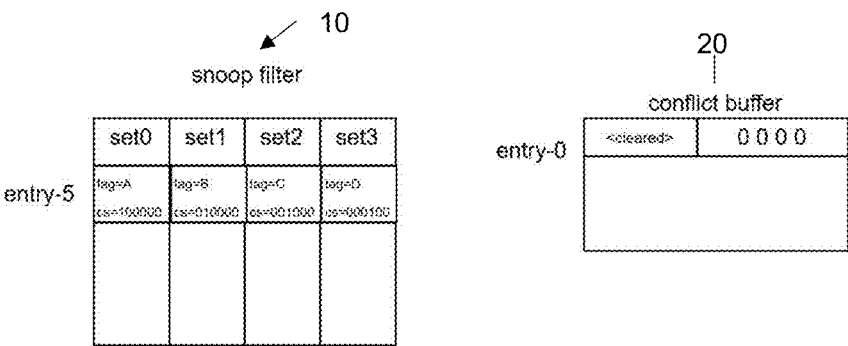
FIG. 10 is an example illustrating the snoop state bits of each set in entry-5 of the snoop filter, where each set is now updated with the information of which CPU has the cacheline.
Figure 11:
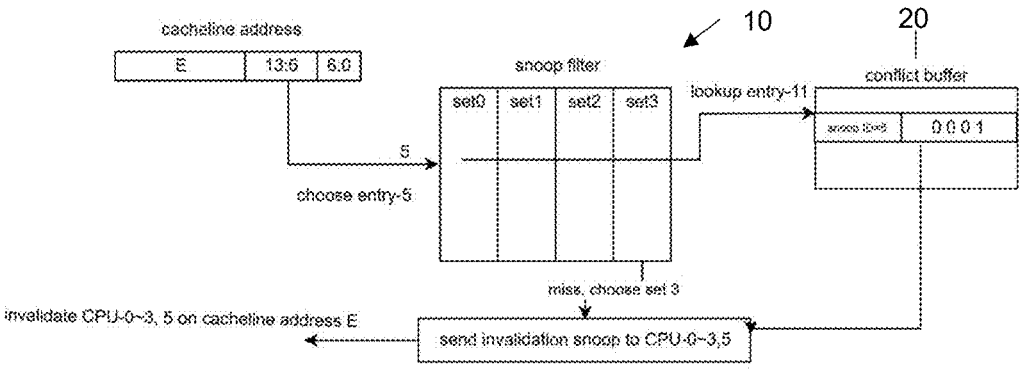
FIG. 11 is an example illustrating a request to address E, with address bits[13:6]==5, will result in a miss.
Figure 12:
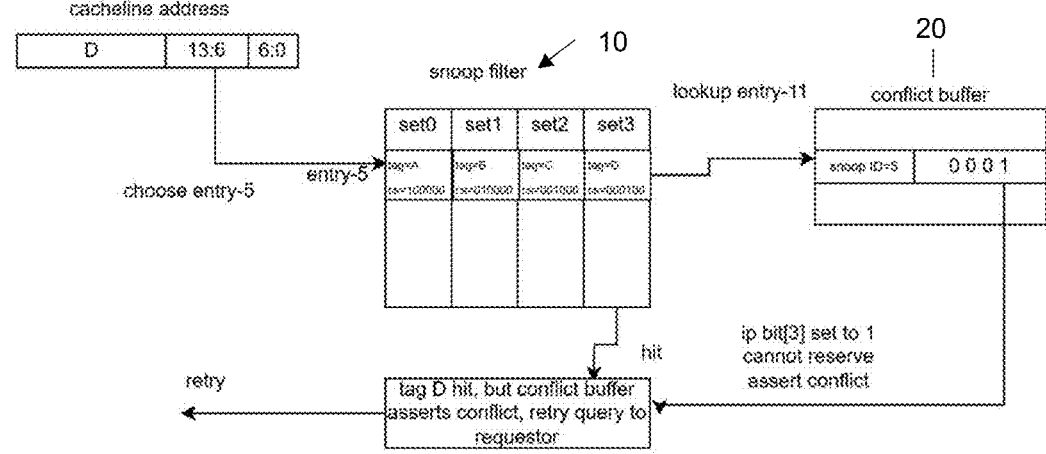
FIG. 12 is an example illustrating that a request on cacheline D has to be postponed and retried at a later time due to conflict on entry-0 of the conflict buffer.
Figure 13:
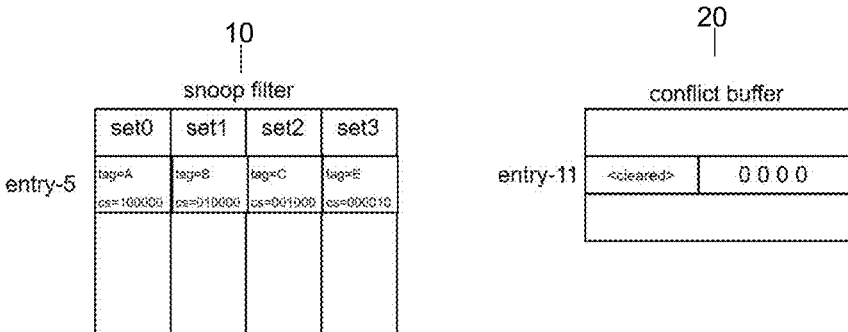
FIG. 13 is an example illustrating conflict buffer entry-11 cleared.
Figure 14:
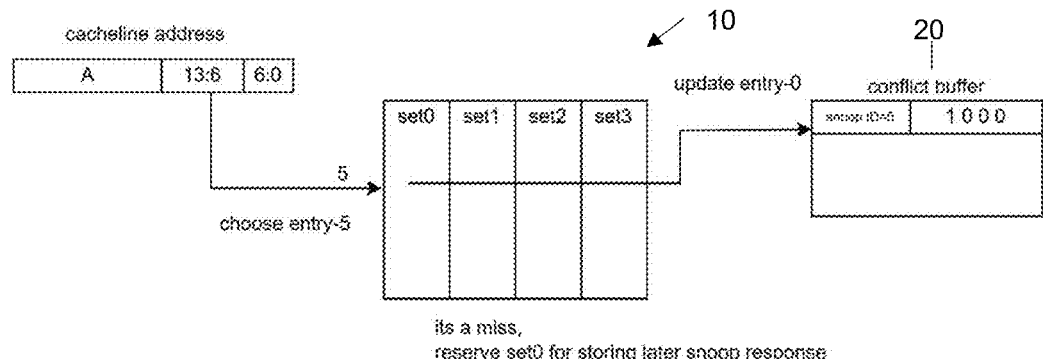
FIG. 14 is an example illustrating way-0 of snoop filter entry 5 is now in progress, i.e., 'ip' bit[0] is set to 1.
Figure 15:
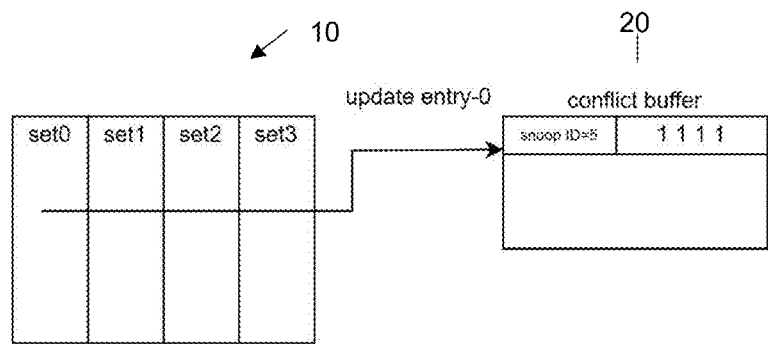
FIG. 15 is an example illustrating all 4 sets have snoops in progress.
Figure 16:
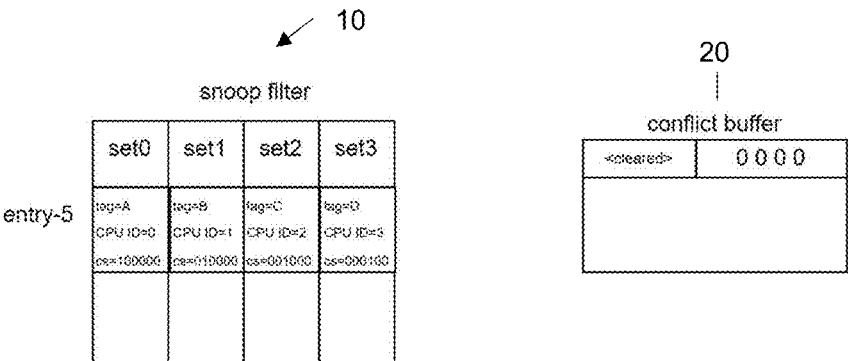
FIG. 16 is an example illustrating that no other sets have snoops in progress.
Figure 17:
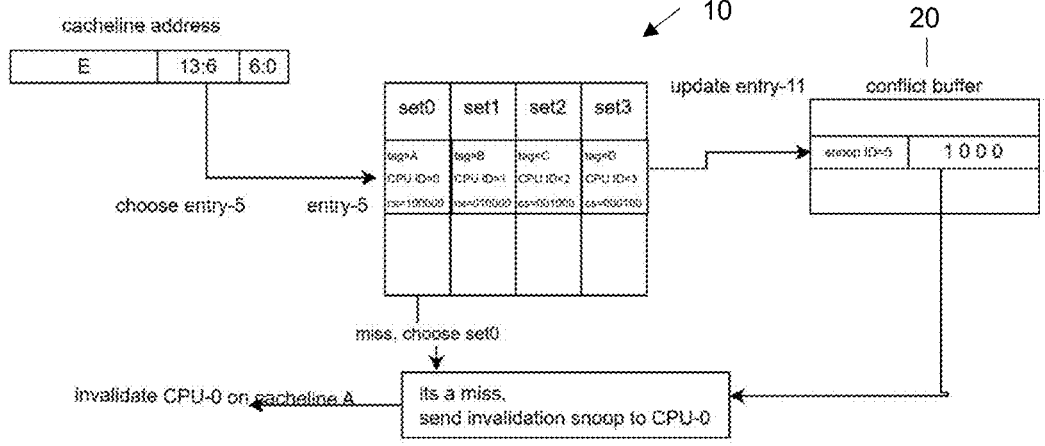
FIG. 17 is an example illustrating that a request to address E with address bit[13:6]==5, will result in a miss.
Figure 18:
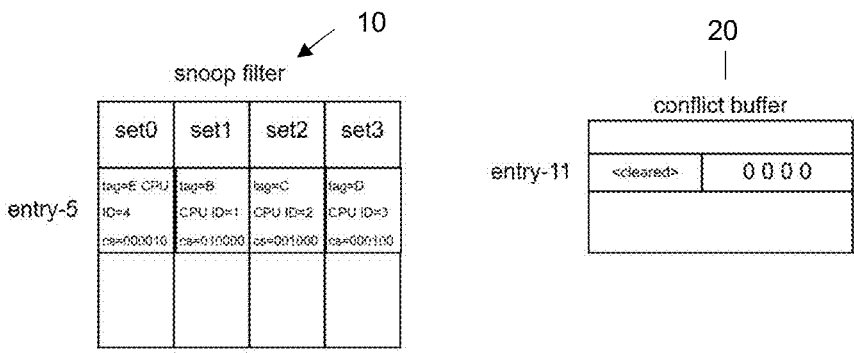
FIG. 18 is illustrating conflict buffer entry 11's in progress bits 'ip' cleared to 0000.

In accordance with an embodiment of the present invention, the conflict buffer (20) is used to track an outstanding snoop, starting from a query from the snoop state machine (30) to the snoop filter (10), and finally until the snoop state machine (30) updates an entry of the snoop filter (10) with the latest processing unit coherency information, in particularly, the processing unit refers to central processing unit (CPU). The 'ip' bits indicates that the snoop is in progress as shown in FIG. 4.

In accordance with an embodiment of the present invention, the coherent system is able to perform two different modes that includes area-saving mode and high-performance mode.

The present invention also related to a method (100) of maintaining cache coherence using the aforesaid coherent system. The method comprises the steps of: sending a query by a snoop state machine to a snoop filter when a processing unit reads a cacheline (101); matching the query address of the snoop filter with the address of the cacheline (102); comparing address of the cacheline with all tags of the snoop filter (103); indicating a miss result in the snoop filter if the tags are not matched (104); choosing a set of the snoop filter to pass the miss result to the snoop state machine (105); searching a snoop ID in a conflict buffer that has a fewer number of entries than the snoop filter, if no entry matched, selecting a free entry in the conflict buffer, marking the snoop ID of the selected free entry of the conflict buffer with the value of the query address and set an in-progress bits of that entry of conflict buffer to 1 that indicates that the snoop filter on the query address is now in progress (106); sending a query to a subsequent cacheline by a subsequent processing unit (107); and repeating the step from comparing address of the subsequent cacheline with all tags of the snoop filter to find a match (108) as shown in FIG. 1.

In accordance with an embodiment of the present invention, for an area-saving mode, sending snoop requests by the snoop state machine (30) to other processing units to snoop for any processing units that contains the same cacheline while searching the snoop ID in the conflict buffer (20) for a miss result.

In accordance with an embodiment of the present invention, hitting snoop filter (10) having the tag matched with the cacheline address when the processing unit requests a repeated cacheline, to enable snoop request sending by the respective processing unit.

In accordance with an embodiment of the present invention, the method further comprising the steps of: postponing snoop requests to other processing units when the in-progress bits of the entry of the conflict buffer (20) is all 1, where the snoop query address is equal to the snoop ID of that entry of the conflict buffer; updating an entry of the snoop filter (10) with information of the processing unit and the ownership of the cacheline; clearing the corresponding in-progress bits to 0; retrying the snoop request to a new cacheline; updating the same entry of the snoop filter (10) with information of the subsequent processing units and subsequent cachelines; and clearing the in-progress bits to all 0.

In accordance with an embodiment of the present invention, an entry of the conflict buffer (20) is free to track other entries of the snoop filter (10) when the its in-progress bits are all 0.

In accordance with an embodiment of the present invention, for a high-performance mode, updating processing units with an exclusive ownership of the respective cacheline.

In accordance with an embodiment of the present invention, performing a snoop invalidation request to the processing unit to release the exclusive ownership of the respective cacheline when the snoop filter (10) of the used entry receives a miss result for a new cacheline, and updating the exclusive ownership of the new cacheline.

Hereinafter, examples of the present invention will be provided for more detailed explanation. The advantages of the present invention may be more readily understood and put into practical effect from these examples. However, it is to be understood that the following examples are not intended to limit the scope of the present invention in any ways.

EXAMPLES

FIG. 2 is an example illustrating a 4-way set associative snoop filter (10) with 256 entries, 8-bits address bits are extracted from the querying address to map to the 256-entries. For example, if a cacheline has 512-bits (64-bytes), then address bits[5:0] are ignored. Address bits[13:6] (8 address bits) can be used to address a 256-entry snoop filter (10).

In a 4-way set associative snoop filter (10) with 256 entries, 8-bits address bits are extracted from the request address to map to the 256-entries. For example, if a cacheline has 512-bits (64-bytes), then address bits[5:0] are ignored. The address bits[13:6] (8 address bits) to address a 256-entry snoop filter (10).

The 8-bits address reads out entry-M from each of the set. The tag is used to compare against the higher bits of the querying cacheline address. In this example, a 4-way set associative snoop filter (10) would have 4 tags. Address bits[31:14] is compared with all 4 tags stored in entry-M (selected by address bits[13:6] of the querying cacheline address). Either all tags do not match, or at most only 1 tag will match, and the hit or miss indication is generated. If it is a hit, the central processing unit (CPU) state field of entry-M of the set that hits, is passed to the snoop state machine (30). If none of the tags matched, then a miss indication is passed to the snoop state machine (30), together with the index of the way that is to be overwritten with new cacheline information. How this index is selected (1 out of 4 sets) is not within the scope or interest of this invention disclosure. A literature research on cache replacement policy would reveal many methods, with least recently used (LRU) being one of them. In this example it is assumed the LRU method to determine the 1 out of the N-indices (in an N-way set associative snoop filter (10)). (NOTE: other implementations may also implement a different method to determine which 1 out of the N-sets to use for replacement, in a N-way set associative snoop filter (10)).

Compared to a coherent system without snoop filter (10), a snoop filter (10) can reduce the number of snoops sent to the CPUs. For example, if there are 4 CPUs in a coherent system, then without a snoop filter (10), at least 3 snoops have to be sent from the requesting CPU or a home agent, to the 3 CPUs. With a snoop filter (10), the snoop filter (10) will know if any of the CPU has the cacheline, or none of the CPU has the cacheline. If none, then no snoop requests are required, and thus saving bandwidth of the system bus or network-on-chip.

The combination of the snoop filter (10) with the conflict buffer, provides two modes of operation.

(1) Are-Saving Mode.

In this mode, the present snoop filter (10) utilizes minimum storage to save area, while still providing benefit in reducing number of snoops required, compared to not using any snoop filter (10).

Table 1 shows each data field (of the tag-data pair), contains the following boolean info (assuming 6 CPUs, i.e. R=6).

TABLE 1

| CPU-0 has cacheline | CPU-1 has cacheline | CPU-2 has cacheline | . . . | . . . | CPU-(R-1) has cacheline |
|---|---|---|---|---|---|

Hence, the data field of each 'way' of an entry in the snoop filter (10) tracks the 'shared' state of the cacheline in all CPUs.

An example to illustrate the dynamics between the snoop state machine (30) and the snoop filter (10) (256 entry, 4-way set associative, with a 32-entry conflict buffer) as shown in FIG. 5 to FIG. 13:

1) CPU-0 perform a read to address A (cacheline A). The snoop state machine (30) sends a query to the snoop filter (10).

2) Query address A[13:6]=5, and this entry 5 of the snoop filter (10). [31:14] is compared to all 4 tags. None matched. This resulted in a miss. The LRU chose set-0. These are passed to the snoop state machine (30).

3) At the same time, the conflict buffer (20) is looked up with the snoop ID=5. None of the entries in the conflict buffer (20) matched, and so a free entry into the conflict buffer (20) is assigned. Assume that entry-0 of the conflict buffer (20) is picked.

4) The conflict buffer (20) entry-0 is marked with 'snoop ID' set to 5 (A[13:6]==5), and out of the 4-bits 'ip' bits, bits[0] set to 1. This indicates that set-0 of snoop filter (10) entry-5 is now in progress.

5) The snoop state machine (30) gets a miss from snoop filter (10). Under the area-saving mode, snoop state machine (30) will send snoop requests to other 5 CPUs because it doesn't recognise if any CPU contains the cacheline A, which known as peer-cache snoop, i.e. snooping peer CPUs on the same address A.

6) While waiting for the snoop responses for the cacheline A. CPU-1 send a request to Cacheline B. B address [13:6] will be used reference into in the snoop filter (10).

7) For this example, it assume that B[13:6]==5, and thus it points to the same entry as the earlier A[13:6] (i.e. B[13:6]==A[13:6]==5). It also assume that B[31:14] !=A[31:14], so there is no hit among the tags of snoop filter (10) entry A[13:6].

8) Since it is a miss, LRU will select one of the way for this query. The snoop state machine (30) will be notified of the miss result and thus it will send snoop request to all other CPUs for cacheline B.

9) At the same time, B[13:6] is compared to all 32-entries of the conflict buffer. Since the value of B[13:6]==A [13:6]==5, entry-0 of conflict buffer (20) will indicate as a conflict hit. The current 'in progress' bits of conflict buffer (20) is 0001, indicating that set-0 is in use.

10) Hence LRU will not select set-0. It should select either set-1/2/3. Assume set-1 is selected by the LRU. So conflict buffer (20) entry-0, will set it's 'in progress' bits to 1100 (indicating set-0 and set are in progress). snoop state machine (30) will send peer-cache snoop requests to other 5 CPUs (CPU 0, 2, 3, 4, 5) because it doesn't know if any CPU contains the cacheline B.

11) Subsequently CPU-2 and CPU-3 send in requests to cacheline C and cacheline D respectively. Assume that coincidentally, C [13:6]==D [13:16]==B[13:16]==A [13:16]==5. Both C and D are mapped to entry 5 of the snoop filter (10).

12) Assuming C [31:14]!=D [31:14], both requests will result in a miss among the tags of entry 5 of the snoop filter (10). LRU will select set-2 for request C and set-3 for request. D. Since entry-5 of the snoop filter (10) is tracked by conflict buffer (20) entry-0, conflict buffer (20) entry-0's 'ip' bits are set to all ones, 1111, indicating that all 4 sets of entry-5 of the snoop filter (10) are currently snoop-in-progress.

13) The snoop state machine (30) will be notified of the miss result and thus it will send peer snoop request to all other CPUs for cacheline C and D.

14) Let's assume that, in the worst case that coincidentally CPU 4 send a request to cacheline E, and E[13:6]==5, and thus it corresponds again to entry-5 of the snoop filter (10). E[31:14] still result in a miss of the snoop filter (10). Entry-0 of conflict buffer (20) also indicates that 'in progress' is all ones, and thus LRU will not be able to allocate any entry to cacheline E. It indicates a 'conflict' to the snoop state machine (30).

15) Seeing the 'conflict' asserted, snoop state machine (30) will temporarily postpone on cacheline E's snoop query (to be retried later).

16) Snoop responses for cacheline A will eventually make their way to snoop state machine (30) and it will update entry-5 set-0 of the snoop filter (10) with information that CPU0 has the cacheline (cpu state or cs=100000) and the tag address (A[31:14]). The conflict buffer (20) entry-0, bits[0] is cleared, marking that set-0 of entry-5 of the snoop filter (10) is no longer in progress.

17) From this point onwards, the query request for cacheline address E can be retried.

18) Snoop responses for cacheline B, C, D will also eventually make their way back to the snoop state machine (30), and the snoop state machine (30) will update entry-5 of the Snoop filter (10), set-1 (for snoop responses corresponding to cacheline B), set-2 (for snoop responses corresponding to cacheline C), and set-3 (for snoop response corresponding to cacheline D). The entry-0 of conflict buffer, 'in progress' bits will eventually be cleared to all 0. When that happens, entry-0 of conflict buffer (20) is now freed up, since it no longer need to track entry-5 of the snoop filter (10), i.e. it can be freely re-assigned/recycled to track other entries of the snoop filter (10). The snoop state bits of each set in entry-5 of the snoop filter (10) is now updated with the information of which CPU has the cacheline.

19) Now if there is a new request from CPUx to cacheline A (or B, C, D) again, it will result in a hit in the snoop filter (10) entry 5. The data from entry 5 and the way with tag that matches address [31:14] will be used by the snoop filter (10) to determine which CPU to send the snoop request. In this example, the cpu state is 100000, this means CPU-0 has the cacheline and thus the snoop state machine (30) will only snoop CPU-0 for the cacheline A.

20) The previous request to cacheline E, which was postponed, can also now be retried. E[13:6] will map to entry-5 of snoop filter (10). The snoop ID of 5 is used to lookup the conflict buffer (20) but matches none. So assume entry-11 of the conflict buffer (20) is assigned. Assume the LRU chooses set-3, and thus the 'in progress' bits[3] of entry-11 of the conflict buffer (20) is set to 0001. The snoop state machine (30) will send out peer-cache snoop to CPU 0, 1, 2, 3, 5 for cacheline address E.

21) This also means previously set-3 tracks the cacheline D, but now it has been reassigned to track cacheline E.

22) If subsequently CPU sending a request to cacheline D, this will result in mapping to entry-5 again in the snoop filter (10). But this time it will result in a hit on set-3. However, entry-0 of conflict buffer (20) has the 'in progress' bits[3] set to 1, which means another earlier request is taking up set-3 and thus this request on Cacheline D has to be postponed and retried at a later time.

23) Once the snoop state machine (30) receives the earlier snoop responses corresponding to cacheline E, the snoop filter (10) is updated with entry-5, set 3's tag set to E, and the conflict buffer (20) entry-11 cleared.

The advantage of area-saving mode is that it will have much fewer conflict buffer (20) entries than the snoop filter (10). The snoop filter (10) can have 1 million entries, but there are only 32 entries in the conflict buffer. The conflict buffer (20) needs to be large enough to track pending or outstanding snoops. Snoop delays are not indefinite, so they do not need a very large conflict buffer. This is a big improvement over existing implementations that may have a 1:1 mapping with the snoop filter (10) for in-progress, in-use, or valid bits.

Apart from that, note that it can have a very small snoop filter (10) for this 'area-saving' mode. Any miss in the snoop filter (10) will just result in the snoop state machine (30) performing a peer snoop request to all CPUs and still being functionally correct. A worst-case 0-entry snoop filter (10) is analogous to the case of not enabling the snoop filter (10), where the snoop state machine (30) always sends peer snoop requests to all CPUs on every cacheline request.

Besides, the penalty of having a small snoop filter (10) in the 'area-saving' mode is an increase in snoop request and snoop response traffic. It does not limit the effective size of the CPU caches. i.e., CPU caches can still be made much bigger than the snoop filter (10).

The reduction in the number of peer snoop requests sent by the snoop state machine (30) is proportional to the size of the snoop filter (10). So if the area permits, the snoop filter (10) size can be increased significantly to reduce snoop traffic (both snoop requests and snoop responses).

(2) High Performance Mode.

The same structures (snoop filter (10) and conflict buffer) are used, with some differences.

Table 2 shows the difference is each set of the snoop filter (10) now tracks additional information.

TABLE 2

| ID of the CPU that is exclusive ownership | CPU-0 sharing cacheline | CPU-1 sharing cacheline | CPU-2 sharing cacheline | ... | ... | CPU-(R-1) sharing cacheline |
|---|---|---|---|---|---|---|
| | | | | | | |

Besides storing information about which CPUs could be sharing the same cacheline (having read-only permission), each entry of the snoop filter also stores the ID of the CPU that has exclusive access to the cacheline. This information is used by the snoop state machine (30) to perform different types of snoops depending on the request type and the CPU snoop state.

The second difference is that a miss on the snoop filter (10) means that none of the CPUs contains the cacheline, and thus the snoop state machine (30) does not need to send any snoop requests. Compare this to the area-saving mode, where a miss on the snoop filter (10) means the snoop state machine (30) needs to send snoop requests to all CPUs. Another way to see this is that the area-saving mode does not keep precise information about the cache states, so it can have much fewer entries, but the downside is that it causes the snoop state machine (30) to send more snoops. The high-performance mode needs to keep precise information of all CPU cache states, nothing more, nothing less, in order to send exactly the minimum number of snoops required, but in doing so, it needs more area to keep this information.

The third difference is that now, with the extra information (the ID of the CPU that is exclusive), the snoop state machine (30) can optimize the final snoop requests required depending on the type of cacheline request.

An example to illustrate how the high performance snoop filter (10) works.

1) CPU-0 performs a read to address A (cacheline A). The snoop state machine (30) sends a query to the snoop filter (10).

2) Request address A[13:6] is mapped to entry 5 (ie A[13:6] has a value of 5) in the snoop filter (10). A[31:14] is compared to all 4 tags. None matched. This resulted in a miss. The LRU chose way-0. These are passed to the snoop state machine (30). The snoop ID 5 is sent to conflict buffer (20) for lookup. Again, none matched and entry-0 of conflict buffer (20) is assigned.

3) The conflict buffer (20) entry-0 is marked with 'snoop entry ID' set to 5 (A[13:6]==5), and the 4-bits 'in progress' bits, 'ip' bits[0] set to 1. This indicates that way-0 of snoop filter (10) entry 5 is now in progress.

4) The snoop state machine (30) gets a miss from snoop filter (10). Under the high performance mode, the snoop state machine (30) does not need to send any snoop requests to other CPUs.

a. This results in much fewer snoop requests (and snoop responses) compared to the area-saving mode, and thus saving bandwidth for the network-on-chip.

5) While cacheline A operation is in progress. CPU-1, CPU-2, and CPU-3 each send a request to Cacheline B, Cacheline C, Cacheline D, respectively.

6) As in the earlier example, all 3 cachelines have address [13:6]==5, and thus they all map to entry-5 of the snoop filter (10). All 3 results in a miss. Entry-0 of conflict buffer (20) also gets updated with the 'ip' in progress bits set to all ones. In order words, all 4 sets are having snoops in progress.

7) The snoop state machine (30) will be notified of the miss result on cacheline B, C, D. However, it does not need to send any snoop request.

8) Since no snoop requests are sent, the snoop state machine (30) can easily update the entry-5 way-0/1/2/3 with these info:

a. Set-0: tag=A[31:14]. CS=100000 (none of the other CPUs share this cacheline). CPU ID=0, i.e. CPU-0 has exclusive ownership of cacheline A b. Set-1: tag=B[31:14]. CS=010000 (none of the other CPUs share this cacheline). CPU ID=1, i.e. CPU-1 has exclusive ownership of cacheline B c. Set-2: tag=C [31:14]. CS=001000 (none of the other CPUs share this cacheline). CPU ID=2, i.e. CPU-2 has exclusive ownership of cacheline C d. Set-3: tag=D [31:14]. CS=000100 (none of the other CPUs share this cacheline). CPU ID=3, i.e. CPU-3 has exclusive ownership of cacheline D 9) The entry-0 of conflict buffer, which tracks entry-5 of snoop filter (10), has its 'in progress' bits all reset to 0, since entry-5 of the snoop filter (10) has been updated and no other sets have snoops in progress.

10) Now subsequently CPU-4 sends a request to cacheline E. E[13:6]==5 and it also maps to entry-5 of the snoop filter (10). The snoop ID 5 is sent to the conflict buffer (20) for lookup, but none of the entries matched. Entry-11 is assigned to this request. Entry-11 of the conflict buffer, which now tracks entry-5 of the snoop filter (10), has the 'in progress' bits all 0, and thus nothing is blocking this request to cacheline E.

11) Since cacheline E is not in any of the set of entry-5, this results in a miss. Let's assume the LRU chose set-0 for this. Conflict buffer (20) entry-0's 'in progress' is set to 1000 (set-0 is in progress).

12) Snoop state machine (30) receives the miss indication on entry-5, way-0 of the snoop filter (10). Snoop state machine (30) performs a snoop invalidation request to CPU-0. This forces CPU-0 to release its cacheline A.

a. This is called a victim cache snoop. Because there were no requests on cacheline A, but it got invalidated anyway to give way to the set in the snoop filter (10) to hold information for cacheline E. So it is a victim due to resource conflict in the snoop filter (10).

b. NOTE this is one of the differences compared the area-savings mode. In area-savings mode, the snoop state machine (30) would send peer snoops to all other CPUs on cacheline E, while CPU-O's cache that contains cacheline A is not affected.

13) After it receives the snoop response from CPU-0, the snoop state machine (30) will update set-0 of entry-5:

a. Set-0: tag=E[31:14]. Data=000010 (none of the other CPUs share this cacheline). CPU ID=4, i.e. CPU-4 has exclusive ownership of cacheline E.

b. Conflict buffer (20) entry 11's in progress bits 'ip' cleared to 0000.

14) Next, CPU-5 sends a request to cacheline A. A[13:6]==5 and it also maps to entry-5 of the snoop filter (10). Entry-0 of the conflict buffer, which tracks entry-5 of the snoop filter (10), has the 'in progress' bits all 0, and thus nothing is blocking this request to cacheline A. Since cacheline A is not in any of the set of entry-5, this results in a miss. LRU chose one of the set, which assume in this example is set-0 again. Conflict buffer (20) entry-11's 'in progress' bits are set to 1000 (set-0 is in progress). Snoop state machine (30) sends an invalidating snoop to CPU-4 on cacheline E.

a. This is the main difference compared with the area-savings mode. In area-savings mode, peer snoops will be sent to all other CPUs (CPU 0, 1, 2, 3, 4), on address A. In high performance mode, only a single snoop to CPU 4 on cacheline address E is sent. CPU4's cacheline E becomes a victim.

15) Then snoop state machine (30) will update way-0 of entry-5:

a. Way-0: tag=A[31:14]. Data=100000 (none of the other CPUs share this cacheline). CPU ID=5, i.e. CPU-5 has exclusive ownership of cacheline A.

Compared to the 'area-saving' mode, the 'high performance' mode has these advantages such as there are far fewer snoop requests. When there is a miss, the snoop state machine (30) will issue a single 'snoop invalidate' request. In the 'area-saving' mode, a miss in the snoop filter (10) will result in snoop requests sent to all other CPUs (except the requesting CPU). Thus, the 'high performance' mode will save the bandwidth of the network on-chip. In addition, for 'high-performance' mode, when it's required to replace an existing snoop filter (10) entry because all the sets are used, this will result in additional invalidation snoop to remove the cacheline from the CPU that contains the cacheline, as opposed to 'area-saving' mode, where the replaced entry is removed without additional invalidation snoop. However, the number of invalidation snoops required will be less since it'll only invalidate CPUs that contain the cacheline and not all CPUs.

For different operations, different snoop filter (10) operation sequences are required, as described below:

1. Allocating operations result in the requester's CPU retaining the cacheline either through sharing or exclusive ownership.

(a) If the snoop filter (10) is a miss:

(i) 'area-saving' mode, perform snoop to all peer CPUs on the requesting address (to force whichever PCU may have this cacheline to give up ownership of this cacheline). If all sets are used, replace an existing set in the snoop filter (10) entry with a new tag and cache state. The replaced tag does not need invalidation.

(ii) 'high-performance' mode, no snoops are required because a miss in the snoop filter (10) gives certainty that no other CPU's cache contains the cacheline. If all sets are used, replace an existing set in the snoop filter (10) entry with a new tag and cache state. The replaced tag will incur invalidation snoops to remove the cacheline (==replaced address) from the CPU with the ID==replaced CPU ID.

(b) If the snoop filter (10) is a hit:

(i) 'area-saving' and 'high-performance' mode, both will perform snoops to CPUs that are indicated in the cache state retrieved from the snoop filter (10). Then new cache states will be updated in the snoop filter (10) according to the requirements of the allocating operation.

2. Deallocation operation, this results in the eviction of CPU cacheline.

(a) If the snoop filter (10) is a miss:

(i) 'area-saving' mode, perform a snoop on all peer CPUs on the requesting address (to force whichever CPU may have this cacheline to evict the cacheline). If all sets are used, replace an existing set in the snoop filter (10) entry with a new tag and cache state. The replaced tag does not need invalidation.

(ii) 'high-performance' mode, no snoops are required because a miss in the snoop filter (10) gives certainty that no other CPU's cache contains the cacheline. No snoop filter (10) update is required because, after this deallocation operation, no other CPUs will retain the cacheline.

(b) If the snoop filter (10) is a hit:

(i) 'area-saving' and 'high-performance' mode, both will perform snoops to CPUs that are indicated in the cache state retrieved from the snoop filter (10). After a deallocation operation, no CPU will retain the cacheline; the set in the snoop filter (10) will be updated with an all-zero cache state.

3. Cache state change operation: this results in a requester CPU or peer CPU cache state change based on the operation requirement.

(a) If the snoop filter (10) is a miss:

(i) 'area-saving' mode, perform snoop on all peer CPUs and update the way with an updated cache state based on the snoop response. If ways are full, replace an existing way in the snoop filter (10) entry.

(ii) In 'high-performance' mode, no snoops are required; a miss in the snoop filter (10) gives certainty that no other CPU's cache contains the cacheline. If ways are full, replace an existing way in the snoop filter (10) entry; the replaced entry will incur invalidation snoops to remove the cacheline from the CPU (ID==CPU ID) that contains the cacheline (address=replaced tag).

(b) If the snoop filter (10) is a hit:

(i) 'area-saving' and 'high-performance' modes will both perform a snoop to the CPU that contains the cacheline in accordance with the operation requirement and update the cache state accordingly.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of maintaining cache coherence using a coherent system, the method comprising:

providing a coherent system including a plurality of processing units, and an interconnect comprising a snoop filter, a conflict buffer to track in-progress or outstanding snoop, and a snoop state machine for managing snoop requests and snoop responses between the snoop filter, the conflict buffer and the plurality of processing units, wherein the snoop filter is configured to copy cacheline data of a cacheline that the plurality of processing units read on, match an address of the cacheline with tags of the snoop filter, and receive the snoop responses, wherein the conflict buffer is configured to indicate a hit or miss status based on matching of the snoop filter and to send peer-cache snoop requests to different processing units of the plurality of processing units;

sending a snoop query by a snoop state machine to a snoop filter when a processing unit reads a cacheline;

matching a query address of the snoop filter with the address of the cacheline;

comparing the address of the cacheline with all tags of the snoop filter;

indicating a miss result in the snoop filter if the tags are not matched;

choosing a set of the snoop filter to pass the miss result to the snoop state machine;

searching a snoop ID in a conflict buffer that has a fewer number of entries than the snoop filter, if no entry matched, selecting a free entry in the conflict buffer, marking a snoop ID of the selected free entry of the conflict buffer with a value of the query address and set an in-progress bits of that entry of the conflict buffer to 1 that it indicates that the snoop query for the query address is now in progress;

sending a query to a subsequent cacheline by a subsequent processing unit; and repeating comparing address of the subsequent cacheline with all tags of the snoop filter to find a match.

2. The method of claim 1, wherein for an area-saving mode, sending snoop requests by the snoop state machine to other processing units to snoop for any processing units that contain a same cacheline while searching the snoop ID in the conflict buffer for a miss result.

3. The method of claim 1, further comprising hitting the snoop filter having the tag matched with the address of the cacheline when the processing unit requests a repeated cacheline, to enable snoop request sending by the processing unit.

4. The method of claim 1, wherein the method further comprises:

postponing snoop requests to other processing units when the in-progress bits of an entry of the conflict buffer is all 1, where a snoop query address is equal to the snoop ID of that entry of the conflict buffer;

updating an entry of the snoop filter with information of the processing unit and its ownership of the cacheline;

clearing one of the in-progress bits to 0;

retrying the snoop request to a new cacheline;

updating a same entry of the snoop filter with information of subsequent processing units and subsequent cachelines; and clearing the in-progress bits to all 0.

5. The method of claim 4, wherein an entry of the conflict buffer is free to track other entries of the snoop filter when the in-progress bits are all 0.

6. The method of claim 1, wherein for a high-performance mode, further comprising updating the processing unit with an exclusive ownership of the respective cacheline.

7. The method of claim 6, wherein performing a snoop invalidation request to the processing unit to release the exclusive ownership of the respective cacheline when the snoop filter of a used entry receives a miss result for a new cacheline, and updating the exclusive ownership of the new cacheline.

* * * * *